M. W. SMITH.
FIELD CONTROL SYSTEM FOR SYNCHRONOUS BOOSTER ROTARY CONVERTERS.
APPLICATION FILED JAN. 16, 1919.
1,392,084.
Patented Sept. 27, 1921.
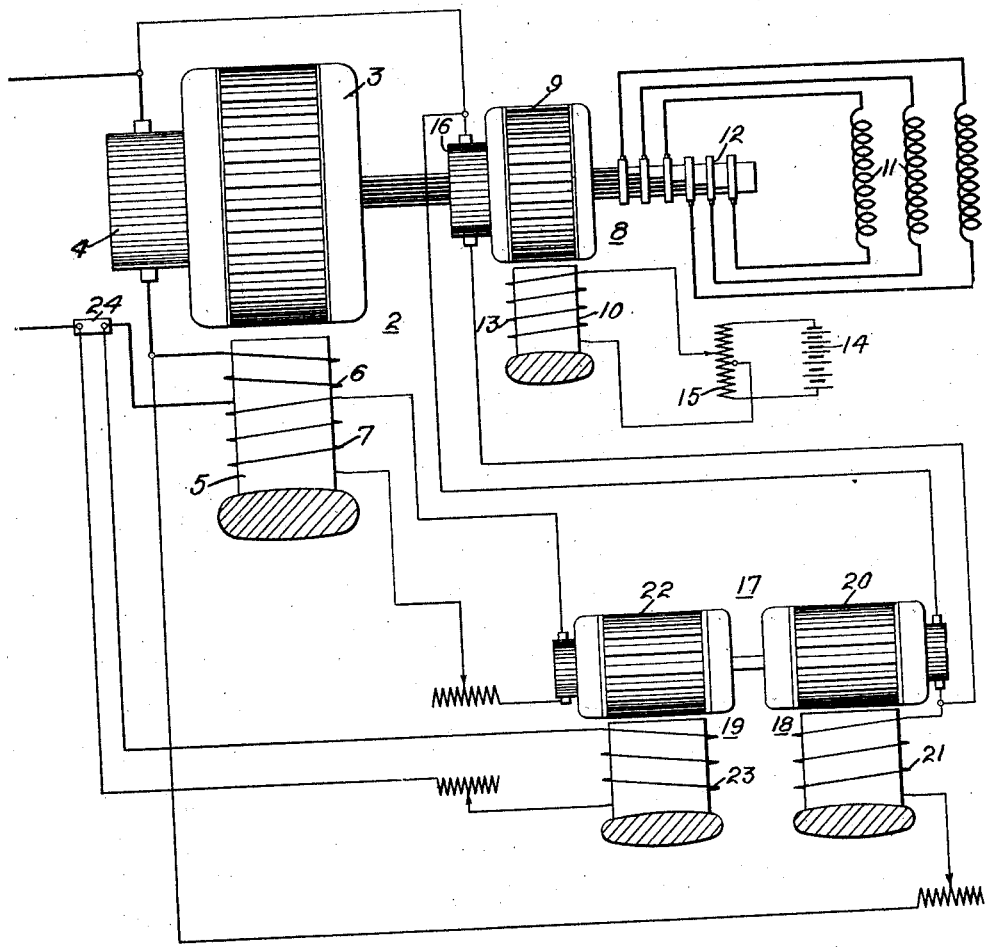
WITNESSES:
J. A. Helsel.
D. C. Davis.
INVENTOR
Marvin W. Smith.
BY
Wesley J. Carr
ATTORNEY

UNITED STATES PATENT OFFICE.

MARVIN W. SMITH, OF WILKINSBURG, PENNSYLVANIA, ASSIGNOR TO WESTINGHOUSE ELECTRIC & MANUFACTURING COMPANY, A CORPORATION OF PENNSYLVANIA.

FIELD-CONTROL SYSTEM FOR SYNCHRONOUS BOOSTER ROTARY CONVERTERS.

1,392,084.

Specification of Letters Patent.  Patented Sept. 27, 1921.

Application filed January 16, 1919. Serial No. 271,438.

*To all whom it may concern:*

Be it known that I, MARVIN W. SMITH, a citizen of the United States, and a resident of Wilkinsburg, in the county of Allegheny and State of Pennsylvania, have invented a new and useful Improvement in Field-Control Systems for Synchronous Booster Rotary Converters, of which the following is a specification.

My invention relates to systems for controlling the interpole-field strength of synchronous booster rotary converters, and it has for its object to provide a system of the character designated that shall be simple and inexpensive in construction and installation and which shall be highly effective in operation.

The single figure of the accompanying drawing is a diagrammatic view of a synchronous booster rotary converter, together with supply, load and auxiliary circuits, embodying a preferred form of my invention.

In the operation of rotary converters, one action of the direct and alternating currents is to largely neutralize each other's heating effects so that the limiting factor in the design of the machine is commutation; and any factors which tend to improve the commutation permit a radical reduction in the size of the machine. It has, therefore, been usual to apply interpoles in order to control the commutating field and, accordingly, the commutating conditions.

In the synchronous-booster rotary converter, the problem of properly exciting an interpole in order to, at all times, provide the proper margin of magnetomotive force over the resultant armature reaction to provide a proper reversing field is quite complicated because of the disturbing effect of the booster machine, as follows.

The equivalent armature reaction of a rotary converter integrated around the converter is, of course, a motor reaction, since the motoring action exceeds the generating action by sufficient to supply the machine losses. Investigation has shown, however, that the armature reaction of a rotary converter in the commutating zone is a generator reaction. When the booster machine is boosting, it is driven as a generator by the rotary converter, the latter acting as a motor and, accordingly, the motor reaction is increased, this action at moderate degrees of boost serving merely to reduce the normal generator reaction under the brushes although it may cause a pure motor reaction in this zone.

On the other hand, during bucking, the booster machine acts as a motor and tends to drive the rotary converter as a generator, increasing the generator reaction in all portions of the armature thereof, including the commutating zone.

Thus, for the proper excitation of an interpole of a synchronous-booster rotary converter, it is necessary, first of all, that the ordinary converter reaction be neutralized and, as this reaction varies with the load current, it suffices to supply a series of exciting field winding upon the interpole. In order to care for the additional reactions introduced by the booster machine, however, it is necessary to apply an auxiliary winding to the interpole and to energize this winding in accordance with the booster activity, both in direction and magnitude. Obviously, the activity of the booster machine, either as a motor or as a generator, varies with the amount of load, assuming constant buck or boost, and further varies with the degree of buck or boost, assuming constant load current. Thus, means must be provided for energizing the auxiliary interpole field winding in accordance with the load current of the converter and also in accordance with the degree of buck or boost of the booster machine, the exciting current reversing in direction as the booster machine passes from buck to boost or vice versa.

I find that this somewhat complicated energization of the auxiliary interpole field winding may be effected in a simple manner by the use of a motor-generator set, the generator of which has its armature connected to the interpole field winding and the field of which is energized in proportion to the load current. The motor of this set is provided with a substantially constant field but derives its armature current from an auxiliary commutated armature winding on the booster machine. The direction and magnitude of this armature current varies with the direction and magnitude of the booster activity so that the motor-generator set is driven in one direction during boosting and in the other direction during bucking, at a speed corresponding to the degree of buck or boost, respectively. The driving of the generator of this set at this speed in a field proportional to the load current results in the production of an armature electromotive force for application to the auxiliary interpole field winding that satisfies all of the requirements in question.

Referring to the accompanying drawings for a more detailed understanding of my invention, I show a rotary converter at 2 embodying an armature 3 having a commutator 4 and further embodying a commutating interpole 5 and an exciting pole (not shown). The interpole 5 is provided with a main field winding 6 and with an auxiliary field winding 7. The main interpole field winding 6 is connected in one of the load-current leads of the converter so as to function as a series winding to compensate for the ordinary converter reaction.

A booster machine 8, embodying an armature 9 and a field pole 10, is mechanically connected to the converter 2, as by having its armature mounted on the shaft thereof, and energy is supplied from a suitable source 11 through slip rings 12 and the armature 9 and the alternating-current terminals of the converter 2, all as is well known and understood in the art.

The booster field pole 10 is provided with an exciting winding 13, energized from a suitable source of unidirectional current 14 through a reversing rheostat 15, so that the electromotive force generated by the booster machine 8 may be reversed, and adjusted in magnitude, to secure any desired degree of buck or boost. The armature 9 of the booster machine is further provided with a small auxiliary winding in the slots thereof, this winding terminating in a suitable commutator 16, all for a purpose to be hereinafter more fully discussed.

A motor-generator set 17 is provided for the energization of the auxiliary interpole field winding 7 and comprises a direct-current motor 18 coupled to a direct-current generator 19. The armature 20 of the motor 18 is connected across the brushes of the commutator 16 of the auxiliary booster armature winding. The field winding 21 of the motor 18 is connected in a series circuit including the auxiliary armature winding of the booster machine and the armature winding of the main converter, the polarities being such that the auxiliary booster winding opposes the main converter winding during boosting and assists the same during bucking, the number of turns in the auxiliary booster winding further being such that the voltage thereof substantially compensates for the alterations in the voltage of the main converter winding, thus maintaining a substantially constant voltage at the terminals of the field winding 21.

The terminals of the armature 22 of the generator 19 are connected to the auxiliary interpole field winding 7, and the field winding 23 of the generator 19 is connected across the terminals of a current shunt 24 inserted in the load circuit, so that the field winding 23 is energized in proportion to the converter load.

It will be obvious that, by these connections, the winding 21 will produce a substantially constant field and that the armature 20 is energized, in direction and magnitude, in accordance with the activities of the booster machine. Thus, the motor-generator set runs in one direction during boosting and in the other direction during bucking, the speed in either direction being proportional to the voltage buck or boost, respectively. The load energization of the generator field winding 23, together with the speed control, results in the production of an output voltage for the armature 22 which is proportional to the converter load current, and also proportional to the booster activity, all as is required for the energization of the auxiliary interpole winding 7 in accordance with the foregoing discussion.

The field winding 21 may be energized from a separate source of direct current, if desired and, furthermore, the booster field rheostat 15 may be connected in parallel to the field winding 21 for the energization of the booster field winding, if desired.

Moreover, the booster field rheostat 15 may be connected between the terminals of the main rotary converter without affecting the operation. This is possible as this resistor is adjusted only when altering the degree of buck or boost and thus only when adjusting the output voltage of the converter. Accordingly, while the output voltage of the converter changes from time to time, adjustment of the rheostat 15 may be so made as to compensate therefor and to secure the proper excitation of the booster field winding.

While I have shown my invention in its preferred form, it will be obvious to those skilled in the art that it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:

1. The combination with a rotary converter, of a booster electrically associated therewith and means varying in accordance with the voltage of said booster for supplying a direct-current voltage in series with the direct-current voltage of said converter for deriving a resultant direct-current voltage differing from the direct-current voltage of the converter.

2. The combination with a rotary converter, of a booster electrically associated therewith for producing a variable direct-current voltage, and means varying in accordance with the voltage of said booster for supplying an auxiliary direct-current voltage in series with the direct-current voltage of said converter, said auxiliary voltage having such value as to produce a constant resultant direct-current voltage.

3. The combination with a rotary converter, of a booster electrically associated therewith, exciting means for adjusting the excitation of said booster, and means responsive to said exciting means for supplying a direct-current voltage in series with the direct-current voltage of said converter for deriving a resultant direct-current voltage differing from the direct-current voltage of the converter.

4. The combination with a rotary converter, of a booster electrically associated therewith for producing a predetermined direct-current voltage characteristic, exciting means for adjusting the excitation of said booster, and means responsive to said exciting means for supplying an auxiliary direct-current voltage in series with the direct-current voltage of said converter, said auxiliary voltage having such value as to produce a constant resultant direct-current voltage.

5. Means for producing a substantially constant unidirectional electromotive force from a variable-voltage, synchronous-booster rotary converter, comprising the combination with said booster rotary converter, of an auxiliary commutated winding on the booster machine and means for connecting said winding in series relation across the terminals of the rotary converter in such polarity that the electromotive force of said auxiliary winding shall oppose the electromotive force of the converter during boosting and aid said electromotive force during bucking, the number of turns in said auxiliary winding being such that a resultant substantially constant electromotive force is produced in said series circuit.

6. The combination with a rotary converter, of a booster electrically associated therewith, a commutated winding on said booster, and means for connecting said winding in series with the direct-current terminals of the rotary converter for deriving a resultant direct-current voltage of different characteristics than the direct-current voltage of the converter.

7. The combination with a rotary converter, of a booster electrically associated therewith, means varying in accordance with the voltage of said booster for supplying a direct-current voltage in series with the direct-current voltage of said converter for deriving a resultant direct-current voltage differing from the direct-current voltage of the converter, means for maintaining a commutating field in said converter having a component which varies in accordance with the load current of said converter, and means for maintaining a component of commutating field which varies both in accordance with said resultant direct-current voltage and in accordance with said booster voltage.

8. The combination with a synchronous booster rotary converter provided with main and auxiliary commutating field windings, of means for energizing said auxiliary commutating field winding in substantial accordance with the load current of the converter and also in substantial accordance with the booster activity, both in direction and in magnitude, comprising a motor-generator set having its generator armature terminals connected to said auxiliary field winding and having its generator field winding connected to be energized in accordance with the load current of said converter, an auxiliary commutated armature winding on the booster machine connected to the motor field winding of said set in series relation with the converter armature in such direction that the electromotive force of said auxiliary winding opposes the converter electromotive force during boosting and aids said electromotive force during bucking, the magnitude of said auxiliary electromotive force being substantially that required to compensate for the variations in the converter electromotive force during different conditions of bucking and boosting, and means for generating a unidirectional electromotive force proportional, in direction and magnitude, to the boosting or bucking activity in said booster machine connected to the armature terminals of the motor of said set.

9. The combination with a synchronous booster rotary converter provided with main and auxiliary commutating field windings, of means for energizing said auxiliary commutating field winding in substantial accordance with the load current of the converter and also in substantial accordance with the booster activity, both in direction and in magnitude, comprising a motor-generator set having its generator armature terminals connected to said auxiliary field winding and having its generator field winding connected to be energized in accordance with the load current of said converter, an auxiliary commutated armature winding on the booster machine connected to the motor field winding of said set in series relation with the converter armature in such direction that the electromotive force of said auxiliary winding opposes the converter electromotive force during boosting and aids said electromotive force during bucking, the magnitude of said auxiliary electromotive force being substantially that required to compensate for the variations in the converter electromotive force during different conditions of bucking and boosting, and means connecting said auxiliary armature winding to the terminals of the motor armature of said set, whereby said motor armature has applied thereto an electromotive force corresponding, in magnitude and direction, to the boosting or bucking activity of the booster machine and said motor field winding has applied thereto a substantially constant electromotive force, so that the speed and direction of rotation of said set correspond to said boosting or bucking activity.

In testimony whereof, I have hereunto subscribed my name this 30th day of Dec., 1918.

MARVIN W. SMITH.